US012772240B2

(12) United States Patent
Xiao et al.

(10) Patent No.: US 12,772,240 B2
(45) Date of Patent: Oct. 20, 2026

(54) METHODS AND APPARATUSES FOR MULTIPLE TRANSMIT-RECEIVE POINT (M-TRP) BASED PHYSICAL UPLINK SHARED CHANNEL (PUSCH) TRANSMISSION

(71) Applicant: LENOVO (BEIJING) LIMITED, Beijing (CN)

(72) Inventors: Lingling Xiao, Beijing (CN); Bingchao Liu, Beijing (CN); Chenxi Zhu, Fairfax, VA (US); Wei Ling, Beijing (CN); Yi Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 356 days.

(21) Appl. No.: 18/681,768

(22) PCT Filed: Aug. 5, 2021

(86) PCT No.: PCT/CN2021/110848
§ 371 (c)(1),
(2) Date: Feb. 6, 2024

(87) PCT Pub. No.: WO2023/010408
PCT Pub. Date: Feb. 9, 2023

(65) Prior Publication Data

US 2024/0205919 A1 Jun. 20, 2024

(51) Int. Cl.
*H04W 72/1268* (2023.01)
*H04L 1/08* (2006.01)
(Continued)

(52) U.S. Cl.
CPC ........... *H04W 72/1268* (2013.01); *H04L 1/08* (2013.01); *H04L 5/0051* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2020/0260391 | A1 | 8/2020 | Zhou |
| 2021/0029650 | A1 | 1/2021 | Cirik |

(Continued)

FOREIGN PATENT DOCUMENTS

| | | | |
|---|---|---|---|
| CN | 109792739 | A | 5/2019 |
| EP | 4280757 | A1 | 11/2023 |
| WO | 2023015098 | A1 | 2/2023 |

OTHER PUBLICATIONS

Moderator "Summary #2 of Multi-TRP PUCCH and PUSCH", 3GPP TSG RAN WG1 #104-bis-e R1-2103844; Apr. 20, 2021; 103 pages.

(Continued)

*Primary Examiner* — Angela Nguyen
(74) *Attorney, Agent, or Firm* — AMPACC Law Group, PLLC

(57) ABSTRACT

Embodiments of the present disclosure relate to methods and apparatuses for multiple transmit-receive point (M-TRP) based physical uplink shared channel (PUSCH) transmission. According to an embodiment of the present disclosure, a method can include: receiving configuration information of a first sounding reference signal (SRS) resource set and a second SRS resource set for a codebook or non-codebook based PUSCH transmission; receiving a configured (CG) configuration for the PUSCH transmission, wherein the CG configuration includes one or two sets of power control parameters, and each set of power control parameter is associated with one SRS resource set of the first SRS resource set or the second SRS resource set; receiving downlink control information (DCI) scheduling a PUSCH retransmission corresponding to the PUSCH transmission
(Continued)

according to the CG configuration; and determining at least one set of power control parameters for the PUSCH retransmission.

20 Claims, 4 Drawing Sheets

(51) Int. Cl.
*H04L 5/00* (2006.01)
*H04W 72/232* (2023.01)

(56) References Cited

U.S. PATENT DOCUMENTS

| | | | | |
|---|---|---|---|---|
| 2023/0041585 | A1* | 2/2023 | Khoshnevisan | H04W 72/23 |
| 2023/0045623 | A1* | 2/2023 | Chen | H04W 52/54 |

OTHER PUBLICATIONS

European Search report dated Mar. 21, 2025 for European Patent Application No. 21952302.4.
Vivo. "Enhancements on Multi-TRP for PUCCH and PUSCH" 3GPP TSG RAN WG1 #105-e R1-2104344, May 27, 2021, 19 pages.
Vivo. "Enhancements on Multi-TRP for PDCCH, PUCCH and PUSCH" 3GPP TSG RAN WG1 #104-e R1-2100422, Feb. 5, 2021, 28 pages.
International Search Report and Written Opinion dated Apr. 25, 2022 for International Application No. PCT /CN2021/110848.

* cited by examiner

```
ConfiguredGrantConfig::=                           SEQUENCE {
   frequencyHopping                              ENUMERATED {intraSlot, interSlot}
OPTIONAL, -- Need S
   cg-DMRS-Configuration                         DMRS-UplinkConfig,
   ...
   powerControlLoopToUse                         ENUMERATED {n0, n1},
   p0-PUSCH-Alpha                                P0-PUSCH-AlphaSetId,
   Additional_powerControlLoopToUse              ENUMERATED {n0, n1},
   Additional_p0-PUSCH-Alpha                     P0-PUSCH-AlphaSetId,
   ...
   rrc-ConfiguredUplinkGrant SEQUENCE {
   ...
   precodingAndNumberOfLayers                    INTEGER (0..63),
   srs-ResourceIndicator                         INTEGER (0..15)
OPTIONAL, -- Need R
   pathlossReferenceIndex                        INTEGER (0..maxNrofPUSCH-PathlossReferenceRSs-1),
   Additional_precodingAndNumberOfLayers         INTEGER (0..63),
   Additional_srs-ResourceIndicator              INTEGER (0..15)
OPTIONAL, -- Need R
   Additional_pathlossReferenceIndex             INTEGER (0..maxNrofPUSCH-PathlossReferenceRSs-1),
   PUSCH_mode                                    INTEGER (0..3)                          OPTIONAL,
-- Need S
        ...
    }
    ...
}
```

FIG. 3

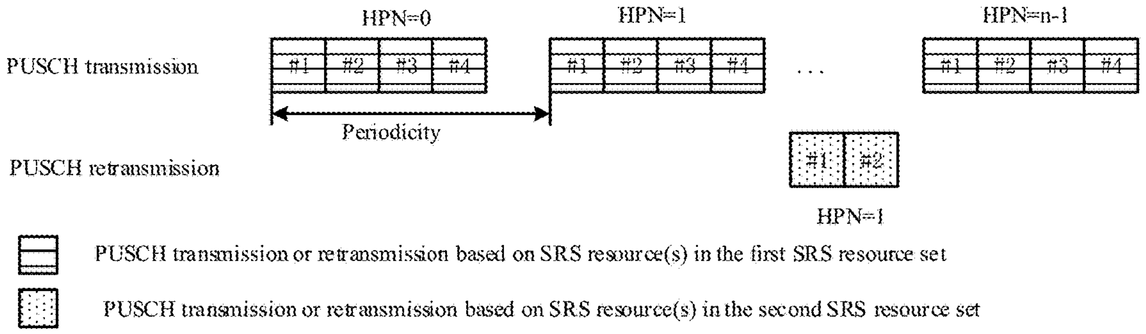

FIG. 4

METHODS AND APPARATUSES FOR MULTIPLE TRANSMIT-RECEIVE POINT (M-TRP) BASED PHYSICAL UPLINK SHARED CHANNEL (PUSCH) TRANSMISSION

CROSS REFERENCE TO RELATED APPLICATIONS

This application is a national phase entry of International Application No. PCT/CN2021/110848, filed on Aug. 5, 2021, which is incorporated by reference in its entirety.

TECHNICAL FIELD

Embodiments of the present application generally relate to wireless communication technology, and in particular to methods and apparatuses for multiple transmit-receive point (M-TRP) based physical uplink shared channel (PUSCH) transmission.

BACKGROUND

M-TRP based transmission has been introduced into New Radio (NR). In NR Rel-17, it is proposed to identify and specify features to improve reliability and robustness for channels besides a physical downlink shared channel (PDSCH), e.g., physical downlink control channel (PDCCH), physical uplink shared channel (PUSCH), and physical uplink control channel (PUCCH), using multiple transmit-receive points (TRPs) and/or multiple panels, with Rel-17 reliability features.

In Rel-16, a PUSCH transmission is transmitted to a single TRP (S-TRP). If a PUSCH transmission according to a configured grant (CG) configuration is incorrectly decoded or not received by a base station (BS), the BS may schedule a PUSCH retransmission by downlink control information (DCI) with cyclic redundancy check (CRC) scrambled by a configured scheduling radio network temporary identity (CS-RNTI) with a new data indicator (NDI) of 1 in the DCI and with a same value of hybrid automatic repeat request (HARQ) process number as the PUSCH transmission. A set of power control parameters (e.g., p0-NominalWithout-Grant, p0-PUSCH-Alpha, powerControlLoopToUse, and pathlossReferenceIndex as specified in 3$^{rd}$ generation partnership project (3GPP) standard documents) used for the PUSCH retransmission may be the same as those used for the PUSCH initial transmission based on the CG configuration.

However, in Rel-17, there may be a case where a PUSCH transmission according to a CG configuration is in an S-TRP mode, whereas a PUSCH retransmission corresponding to the PUSCH transmission is in an M-TRP mode for higher reliability. In addition, there may be another case where a PUSCH transmission according to a CG configuration and the corresponding PUSCH retransmission are both in an S-TRP mode but they are transmitted to different TRPs. In these cases, the above principle in Rel-16 for determining the set(s) of power control parameters for the PUSCH retransmission is no longer applicable since power control parameters are TRP specific. Given this, how to determine at least one set of power control parameters for a PUSCH retransmission in an M-TRP scenario needs to be addressed.

Besides, for a CG Type 1 PUSCH transmission, a CG Type 1 PUSCH retransmission, or a CG Type 2 PUSCH retransmission in an M-TRP scenario, whether it is in an S-TRP mode or M-TRP mode or to which TRP it is transmitted needs to be determined and indicated to a user equipment (UE), such that the UE may determine a set of power control parameters for a PUSCH (re)transmission to the corresponding TRP.

Given the above, it is desirable to provide improved solutions for M-TRP based PUSCH transmission to address the above issues.

SUMMARY OF THE APPLICATION

Some embodiments of the present application provide technical solutions for M-TRP based PUSCH transmission.

According to some embodiments of the present application, a method performed by a UE may include: receiving configuration information of a first sounding reference signal (SRS) resource set and a second SRS resource set for a codebook or non-codebook based PUSCH transmission; receiving a CG configuration for the PUSCH transmission, wherein the CG configuration includes one or two sets of power control parameters, and each set of power control parameter is associated with one SRS resource set of the first SRS resource set or the second SRS resource set; receiving downlink control information (DCI) scheduling a PUSCH retransmission corresponding to the PUSCH transmission according to the CG configuration; and determining at least one set of power control parameters for the PUSCH retransmission.

In some embodiments of the present application, the DCI may include a PUSCH mode field indicating whether the PUSCH retransmission is transmitted based on SRS resource(s) in the first SRS resource set, SRS resource(s) in the second SRS resource set, or both SRS resource(s) in the first SRS resource set and SRS resource(s) in the second SRS resource set.

In some embodiments of the present application, the CG configuration includes two sets of power control parameters, wherein one set of power control parameters is associated with the first SRS resource set, and the other set of power control parameters is associated with the second SRS resource set.

In some embodiments of the present application, in the case that the PUSCH transmission is a CG Type 1 PUSCH transmission, the CG configuration includes a PUSCH mode field indicating whether the PUSCH transmission is transmitted based on SRS resource(s) in the first SRS resource set, SRS resource(s) in the second SRS resource set, or both SRS resource(s) in the first SRS resource set and SRS resource(s) in the second SRS resource set.

In some embodiments of the present application, determining the at least one set of power control parameters for the PUSCH retransmission includes at least one of: for the PUSCH retransmission based on SRS resource(s) in the first SRS resource set as indicated by the PUSCH mode field in the DCI, determining, based on the CG configuration, the one set of power control parameters to be used for the PUSCH retransmission; and for the PUSCH retransmission based on SRS resource(s) in the second SRS resource set as indicated by the PUSCH mode field in the DCI, determining, based on the CG configuration, the other set of power control parameters to be used for the PUSCH retransmission.

In some embodiments of the present application, the CG configuration includes only one set of power control parameters used for the PUSCH transmission.

In some embodiments of the present application, in the case that the PUSCH transmission is a CG Type 1 PUSCH transmission, the CG configuration includes a PUSCH mode field indicating whether the PUSCH transmission is transmitted based on SRS resource(s) in the first SRS resource set or SRS resource(s) in the second SRS resource set.

In some embodiments of the present application, in the case that the PUSCH transmission is a CG Type 1 PUSCH transmission, the CG configuration includes an identity (ID) of the first SRS resource set or the second SRS resource set used for the PUSCH transmission.

In some embodiments of the present application, determining the at least one set of power control parameters for the PUSCH retransmission includes at least one of: for the PUSCH retransmission based on SRS resource(s) in an SRS resource set indicated by the PUSCH mode field in the DCI which is the same as an SRS resource set used for the PUSCH transmission, determining the set of power control parameters used for the PUSCH transmission to be reused for the PUSCH retransmission; and for the PUSCH retransmission based on SRS resource(s) in an SRS resource set indicated by the PUSCH mode field in the DCI which is different from an SRS resource set used for the PUSCH transmission, determining a set of power control parameters to be used for the PUSCH retransmission based on an SRS resource indicator (SRI) field in the DCI which is associated with the SRS resource set indicated by the PUSCH mode field in the DCI.

In some embodiments of the present application, determining the at least one set of power control parameters for the PUSCH retransmission includes: for the PUSCH retransmission based on SRS resource(s) in an SRS resource set indicated by the PUSCH mode field in the DCI, determining a set of power control parameters to be used for the PUSCH retransmission based on an SRI field associated with the SRS resource set indicated by the PUSCH mode field in the DCI.

In some embodiments of the present application, the PUSCH transmission is a CG Type 2 PUSCH transmission, and the method further includes: receiving a DCI format 0_0 to activate the PUSCH transmission, wherein the DCI format 0_0 includes a PUSCH mode field indicating whether the PUSCH transmission is transmitted based on SRS resource(s) in the first SRS resource set or SRS resource(s) in the second SRS resource set; and determining a set of power control parameters associated with the first SRS resource set or the second SRS resource set indicated by the PUSCH mode field in the DCI format 0_0 to be used for the PUSCH transmission.

In some embodiments of the present application, the PUSCH transmission is a CG Type 2 PUSCH transmission, and the method further includes: receiving a DCI format 0_0 to activate the PUSCH transmission; and determining one SRS resource set of the first SRS resource set and the second SRS resource set and a set of power control parameters associated with the one SRS resource set to be used for the PUSCH transmission based on a pre-defined rule.

In some embodiments of the present application, in the case that the DCI scheduling the PUSCH retransmission is a DCI format 00, the DCI format 0_0 includes a PUSCH mode field indicating whether the PUSCH retransmission is transmitted based on SRS resource(s) in the first SRS resource set or SRS resource(s) in the second SRS resource set, and wherein determining the at least one set of power control parameters for the PUSCH retransmission includes: determining a set of power control parameters associated with the first SRS resource set or the second SRS resource set indicated by the PUSCH mode field in the DCI to be used for the PUSCH retransmission.

In some embodiments of the present application, in the case that the DCI scheduling the PUSCH retransmission is a DCI format 00, determining the at least one set of power control parameters for the PUSCH retransmission includes: determining one SRS resource set of the first SRS resource set and the second SRS resource set and a set of power control parameters associated with the one SRS resource set to be used for the PUSCH retransmission based on a pre-defined rule.

According to some other embodiments of the present application, a method performed by a BS may include: transmitting configuration information of a first SRS resource set and a second SRS resource set for a codebook or non-codebook based PUSCH transmission; transmitting a CG configuration for the PUSCH transmission, wherein the CG configuration includes one or two sets of power control parameters, and each set of power control parameter is associated with one SRS resource set of the first SRS resource set or the second SRS resource set; and transmitting DCI scheduling a PUSCH retransmission corresponding to the PUSCH transmission according to the CG configuration.

In some embodiments of the present application, the DCI includes a PUSCH mode field indicating whether the PUSCH retransmission is transmitted based on SRS resource(s) in the first SRS resource set, SRS resource(s) in the second SRS resource set, or both SRS resource(s) in the first SRS resource set and SRS resource(s) in the second SRS resource set.

In some embodiments of the present application, the CG configuration includes two sets of power control parameters, wherein one set of power control parameters is associated with the first SRS resource set, and the other set of power control parameters is associated with the second SRS resource set.

In some embodiments of the present application, in the case that the PUSCH transmission is a CG Type 1 PUSCH transmission, the CG configuration includes a PUSCH mode field indicating whether the PUSCH transmission is transmitted based on SRS resource(s) in the first SRS resource set, SRS resource(s) in the second SRS resource set, or both SRS resource(s) in the first SRS resource set and SRS resource(s) in the second SRS resource set.

In some embodiments of the present application, the CG configuration includes only one set of power control parameters used for the PUSCH transmission.

In some embodiments of the present application, in the case that the PUSCH transmission is a CG Type 1 PUSCH transmission, the CG configuration includes a PUSCH mode field indicating whether the PUSCH transmission is transmitted based on SRS resource(s) in the first SRS resource set or SRS resource(s) in the second SRS resource set.

In some embodiments of the present application, in the case that the PUSCH transmission is a CG Type 1 PUSCH transmission, the CG configuration includes an ID of the first SRS resource set or the second SRS resource set used for the PUSCH transmission.

In some embodiments of the present application, the PUSCH transmission is a CG Type 2 PUSCH transmission, and the method further includes: transmitting a DCI format 0_0 to activate the PUSCH transmission, wherein the DCI format 0_0 includes a PUSCH mode field indicating whether the PUSCH transmission is transmitted based on SRS resource(s) in the first SRS resource set or SRS resource(s) in the second SRS resource set.

In some embodiments of the present application, in the case that the DCI scheduling the PUSCH retransmission is a DCI format 00, the DCI format 0_0 includes a PUSCH mode field indicating whether the PUSCH retransmission is transmitted based on SRS resource(s) in the first SRS resource set or SRS resource(s) in the second SRS resource set.

Some embodiments of the present application also provide an apparatus, including: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as described in the present application with the at least one receiving circuitry, the at least one transmitting circuitry and the at least one processor.

Embodiments of the present application provide technical solutions for M-TRP PUSCH repetition transmission, which include but are not limited to several methods to determine a set of power control parameters for a CG Type 1 or Type 2 PUSCH retransmission and/or to determine at least one of a CG Type 1 PUSCH transmission mode and a CG Type 1 or Type 2 PUSCH retransmission mode in an M-TRP scenario.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 3 illustrates an exemplary CG configuration according to some embodiments of the present application;

FIG. 4 illustrates exemplary PUSCH transmission and PUSCH retransmission towards different TRPs according to some embodiments of the present application;

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more base stations (BSs) and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, one single TRP can be used to serve one or more UEs under control of a BS. In different scenarios, TRP may be called in different terms. Persons skilled in the art should understand that as the 3GPP and the communication technology develop, the terminologies recited in the specification may change, which should not affect the scope of the present application. It should be understood that the TRP(s) (or panel(s)) configured for the BS may be transparent to a UE.

Figure 1:
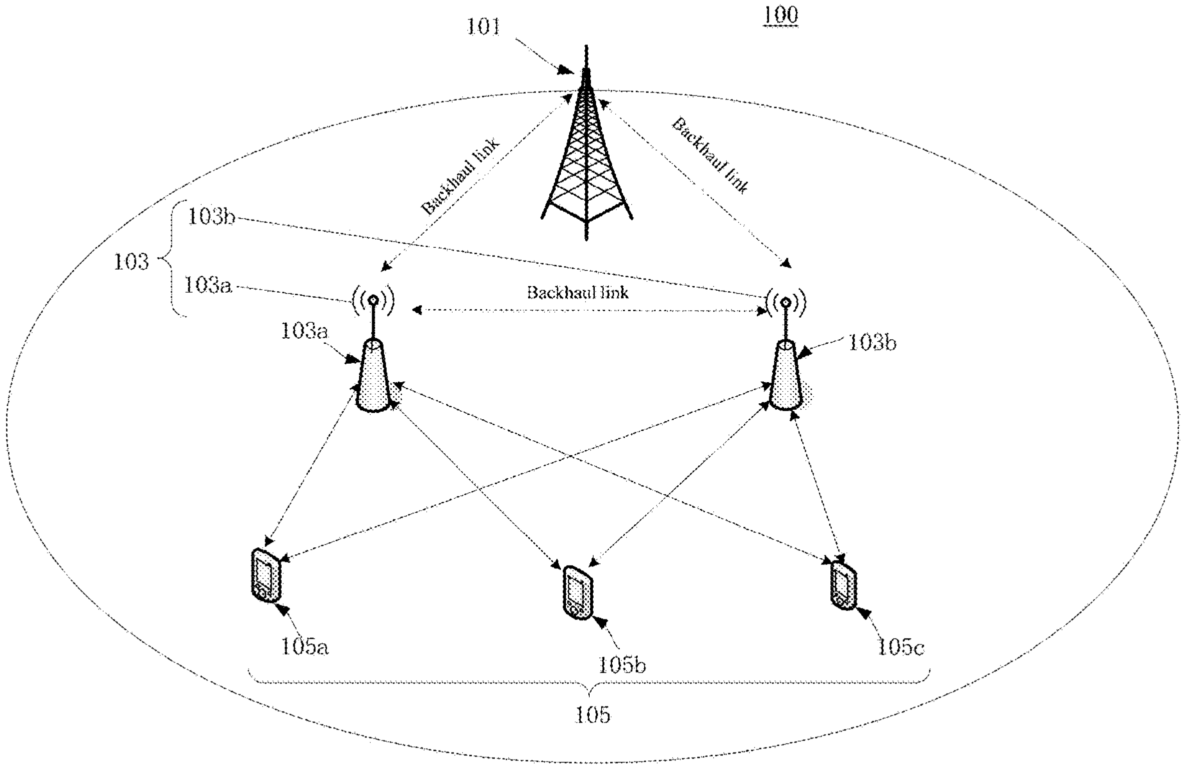
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

Referring to FIG. 1, the wireless communication system 100 can include a BS 101, TRPs 103 (e.g., TRP 103*a* and TRP 103*b*), and UEs 105 (e.g., UE 105*a*, UE 105*b*, and UE 105*c*). Although only one BS 101, two TRPs 103 and three UEs 105 are shown for simplicity, it should be noted that the wireless communication system 100 may include more or less communication device(s), apparatus, or node(s) in accordance with some other embodiments of the present application.

In some embodiments of the present application, the BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the UE 105*a*, the UE 105*b*, and the UE 105*c*) may include, for example, but is not limited to, a computing device, a wearable device, a mobile device, an internet of things (IoT) device, a vehicle, etc.

The TRPs 103, for example, the TRP 103*a* and the TRP 103*b*, can communicate with the BS 101 via, for example, a backhaul link. Each of TRPs 103 can serve some or all of the UEs 105. As shown in FIG. 1, the TRP 103*a* can serve some mobile stations (which include the UE 105*a*, the UE 105*b*, and the UE 105*c*) within a serving area or region (e.g., a cell or a cell sector). The TRP 103*b* can serve some mobile stations (which include the UE 105*a*, the UE 105*b*, and the UE 105*c*) within a serving area or region (e.g., a cell or a cell sector). The TRP 103*a* and the TRP 103*b* can communicate with each other via, for example, a backhaul link.

In Rel-17, PUSCH transmission to M-TRP is specified to improve reliability and robustness wherein each PUSCH transmission to a TRP carries a same transport block (TB). In RAN1 #103*e* meeting, two SRS resource sets used for codebook (CB) or non-codebook (nCB) based PUSCH transmission may be configured for a UE in a bandwidth part (BWP) to support M-TRP PUSCH repetition transmission, wherein one SRS resource set is used for at least one PUSCH transmission towards a TRP, and the other SRS resource set is used for at least one PUSCH transmission towards another TRP. Two SRI fields in an UL grant are used for indicating SRS resource(s) in the two SRS resource sets for a PUSCH transmission respectively where each SRI field is associated with an SRS resource set.

For a codebook based PUSCH transmission according to an SRS resource set, a BS will indicate a precoding matrix from a pre-defined codebook to a UE, e.g., the precoding matrix is indicated based on the SRS resource(s) in the SRS resource set configured to the UE, and the UE will apply the precoding matrix to the PUSCH transmission.

For a non-codebook based PUSCH transmission according to an SRS resource set, the UE shall first transmit the SRS resource(s) within the SRS resource set to the BS, wherein each SRS resource is transmitted with a different precoding matrix calculated by the UE. Then, the BS may indicate one or more SRS resources by an SRI field to the UE for a PUSCH transmission, and then the UE may apply the same precoding matrix(es) as those for the indicated one or more SRS resources to the PUSCH transmission.

PUSCH transmission(s) (e.g., CB or nCB based PUSCH transmission(s)) can be dynamically scheduled by an uplink (UL) grant in a DCI, or the PUSCH transmission can be transmitted according to a CG Type 1 or Type 2 configuration.

The CG Type 1 PUSCH transmission (which means a PUSCH transmission is transmitted according to a CG Type 1 configuration) is semi-statically configured to operate upon the reception of a CG configuration (e.g., ConfiguredGrantConfig as specified in TS 38.331) including a configured UL grant (e.g. rrc-ConfiguredUplinkGrant in TS 38.331) without the detection of an UL grant in a DCI. The CG Type 2 PUSCH transmission (which means a PUSCH transmission is transmitted according to a CG Type 2 configuration) is semi-persistently scheduled by an UL grant in a valid activation DCI after the reception of a CG configuration (e.g., ConfiguredGrantConfig as specified in TS 38.331) not including a configured UL grant (e.g. rrc-ConfiguredUplinkGrant in TS 38.331).

In Rel-16, if a CG Type 1 PUSCH transmission or a CG Type 2 PUSCH transmission is incorrectly decoded, a BS may schedule a PUSCH retransmission by a PDCCH (carrying a scheduling DCI) with CRC scrambled by CS-RNTI with NDI=1 in the scheduling DCI and with a same HARQ process number (HPN) value as the PUSCH transmission. For the PUSCH retransmission corresponding to the CG Type 1 PUSCH transmission or the CG Type 2 PUSCH transmission, the UE shall transmit the PUSCH retransmission according to parameters configured in pusch-Config as specified in 3GPP standard documents and indications in the scheduling DCI except for p0-NominalWithoutGrant (which is used for configuring cell specific P0 value for UL grant-free/semi-persistent scheduling (SPS) based PUSCH), p0-PUSCH-Alpha (which is used for configuring a P0 value and an alpha value, where P0 configures the target receive power at BS and alpha configures a factor for partial pathloss compensation), powerControlLoopToUse (which is used for configuring a closed loop index for closed loop power control) and pathlossReferenceIndex (which is used for a UE to estimate the pathloss) as specified in 3GPP standard documents.

In other words, a set of power control parameters (e.g., p0-NominalWithoutGrant, p0-PUSCH-Alpha, powerControlLoopToUse, and pathlossReferenceIndex as specified in 3GPP standard documents) used for the PUSCH retransmission may be the same as those used for the PUSCH transmission which are configured in a CG configuration. That is, for a CG Type 1 PUSCH retransmission, the p0-NominalWithoutGrant is configured in a PUSCH power configuration (e.g., PUSCH-PowerControl as specified in TS 38.331), and the other power control parameters are configured by the CG configuration according to which the PUSCH transmission is transmitted. For a CG Type 2 PUSCH retransmission, a set of power control parameters except for pathlossReferenceIndex (which is determined from SRI-PUSCH-PowerControl for configuring a set of power control parameters for PUSCH transmission with an sri-PUSCH-PowerControl ID mapped to a value of the SRI field) are determined in a same way as a CG Type 1 PUSCH retransmission.

However, in Rel-17, there may be a case where the PUSCH transmission according to a CG configuration is transmitted to a single TRP, for example to TRP #1, whereas the corresponding PUSCH retransmission is in an M-TRP mode for higher reliability, for example PUSCH retransmission to TRP #1 and TRP #2. In addition, there may be another case where the PUSCH transmission is transmitted to TRP #1 and the PUSCH retransmission is transmitted to TRP #2 due to, for example, the blockage of the TRP #1. In these cases, the above principle in Rel-16 for determining the set of power control parameters for the PUSCH retransmission is no longer applicable since the power control parameters are TRP specific except p0-NominalWithoutGrant which is same for both TRPs for configuring cell specific P0 value for UL grant-free/SPS based PUSCH. Given this, how to determine a set of power control parameters for a PUSCH retransmission to a TRP when two SRS resource sets for codebook or non-codebook based transmission are configured to a UE needs to be addressed.

Besides, in RAN1 #**105*e*** meeting, for a CG Type 2 PUSCH transmission, it is agreed that using a new field in the activating DCI indicate a CG Type 2 PUSCH transmission mode, i.e., indicating a CG Type 2 PUSCH transmission to TRP #1, or to TRP #2, or to both TRP #1 and TRP #2. However, for a CG Type 1 PUSCH transmission, how to indicate whether it is in an S-TRP mode or M-TRP mode or to which TRP it is transmitted has not been discussed yet. In addition, how to indicate a CG Type 1 PUSCH retransmission mode or a CG Type 2 PUSCH retransmission mode also has not been discussed yet.

Given the above, embodiments of the present application aim to provide solutions for M-TRP based PUSCH transmission. Accordingly, embodiments of the present application provide, for example, several methods to determine at least a set of power control parameters for a CG Type 1 or Type 2 PUSCH retransmission and/or to determine a CG Type 1 PUSCH transmission mode and a CG Type 1 or Type 2 PUSCH retransmission mode in an M-TRP scenario (e.g., when two SRS resource sets are configured for a CB or nCB based PUSCH transmission). More details on embodiments of the present application will be described in the following text in combination with the appended drawings.

Figure 2:
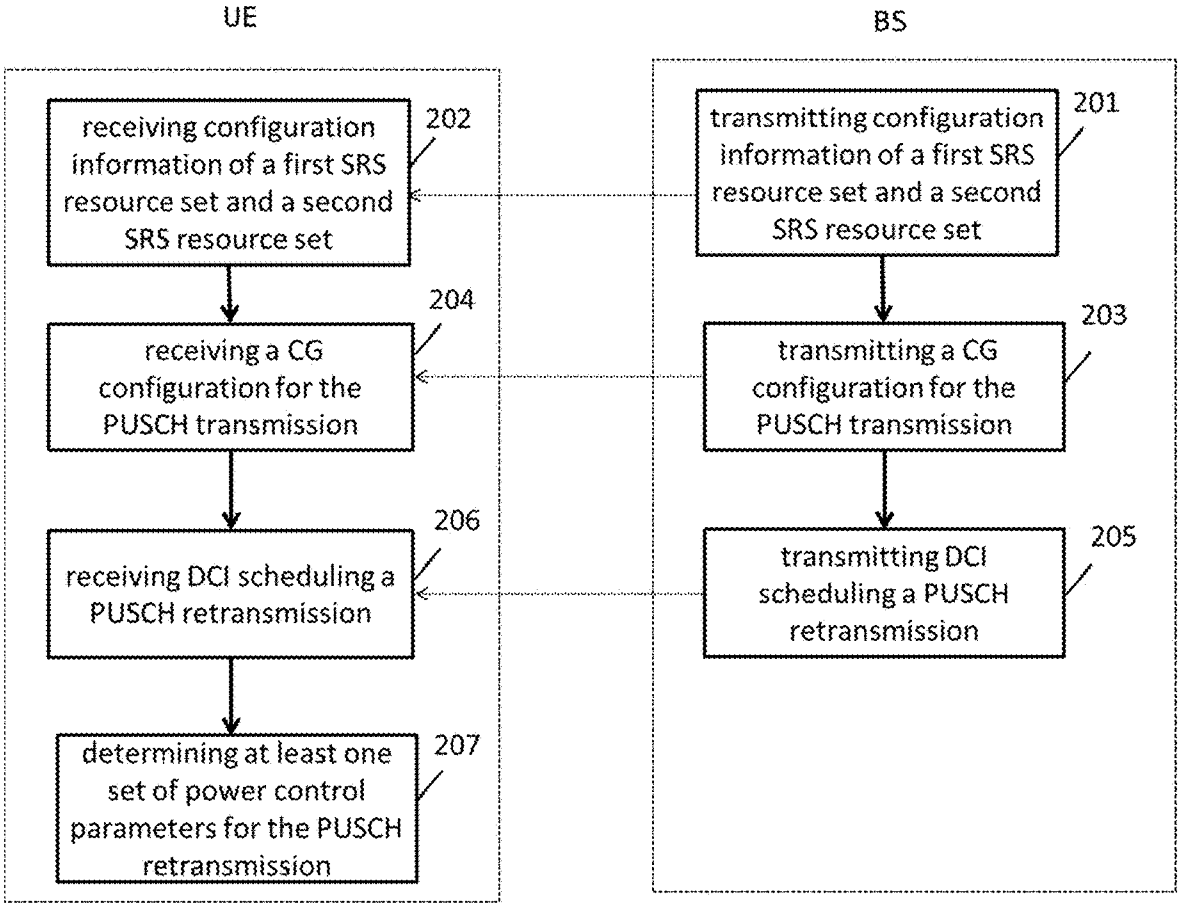
FIG. 2 illustrates a flow chart of an exemplary method for M-TRP based PUSCH transmission according to some embodiments of the present application.

FIG. 2 illustrates a flow chart of an exemplary method for M-TRP based PUSCH transmission according to some embodiments of the present application. Although the method is illustrated in a system level by a UE and a BS (e.g., UE 105 and BS 101 as illustrated and shown in FIG. 1), persons skilled in the art can understand that the method implemented in the UE and that implemented in the BS can be separately implemented and incorporated by other apparatus with the like functions.

As shown in FIG. 2, in step 201, a BS may transmit configuration information of a first SRS resource set and a second SRS resource set for a codebook or non-codebook based PUSCH transmission (hereinafter referred to as "PUSCH transmission") to the UE. The first SRS resource set may refer to the SRS resource set with a lower index or identifier (ID) (e.g., SRS-ResourceId as specified in 3GPP standard documents), and the second SRS resource set may refer to the SRS resource set with a higher index or ID. The first SRS resource set may be used for at least one PUSCH transmission towards a first TRP (e.g., TRP #1), and the second SRS resource set may be used for at least one PUSCH transmission towards a second TRP (e.g., TRP #2). Each of the first SRS resource set and the second SRS resource set may include at least one SRS resource.

Consequently, in step 202, a UE may receive the configuration information of the first SRS resource set and the second SRS resource set from the BS.

In step 203, the BS may transmit a CG configuration for a PUSCH transmission. The CG configuration may be one of a plurality of CG configurations configured in a BWP of a serving cell. For example, the plurality of CG configurations may include up to 12 CG configurations configured in a BWP in Rel-16.

There are two types of CG configurations for a PUSCH transmission, i.e., CG Type 1 and CG Type 2. Based on the two types of CG configurations, there are two types of CG PUSCH transmissions, i.e., a CG Type 1 PUSCH transmission and a CG Type 2 PUSCH transmission. The CG Type 1 PUSCH transmission is semi-statically configured to operate upon the reception of a CG configuration (e.g., ConfiguredGrantConfig as specified in TS 38.331) including a configured UL grant (e.g. rrc-ConfiguredUplinkGrant in TS 38.331) without the detection of an UL grant in a DCI. The CG Type 2 PUSCH transmission is semi-persistently scheduled by an UL grant in a valid activation DCI after the reception of a CG configuration (e.g., ConfiguredGrantConfig as specified in TS 38.331) not including a configured UL grant (e.g. rrc-ConfiguredUplinkGrant in TS 38.331).

According to some embodiments of the present application, the CG configuration may include one or two sets of power control parameters. Each set of power control parameter is associated with one SRS resource set of the first SRS resource set or the second SRS resource set by a predefined rule.

For a CG Type 1 PUSCH transmission, each set of power control parameters in the CG configuration may include: P0 (e.g., "P0" in "p0-PUSCH-Alpha" as specified in 3GPP standard documents), Alpha (e.g., "Alpha" in "p0-PUSCH-Alpha" as specified in 3GPP standard documents), closed loop index (e.g., powerControlLoopToUse as specified in 3GPP standard documents), and pathloss reference signal (PL-RS) index (e.g., pathlossReferenceIndex as specified in 3GPP standard documents).

For a CG Type 2 PUSCH transmission, each set of power control parameters in the CG configuration may include: P0 (e.g., "P0" in "p0-PUSCH-Alpha" as specified in 3GPP standard documents), Alpha (e.g., "Alpha" in "p0-PUSCH-Alpha" as specified in 3GPP standard documents), and closed loop index (e.g., powerControlLoopToUse as specified in 3GPP standard documents). The PL-RS index for a CG Type 2 PUSCH transmission may be determined based on DCI activating the PUSCH transmission, which is also referred to as "activating DCI."

The set of power control parameters (e.g., P0, Alpha, closed loop index, and PL-RS index) may be used to determine the transmission power of the PUSCH transmission.

Consequently, in step 204, the UE may receive the CG configuration for the PUSCH transmission from the BS.

According to some embodiments of the present application, the CG configuration may include two sets of power control parameters, wherein one set of power control parameters is associated with the first SRS resource set, and the other set of power control parameters is associated with the second SRS resource set. In some embodiments of the present application, all the plurality of CG configurations configured in a BWP may include two sets of power control parameters. For example, each of the 12 CG configurations configured in a BWP in Rel-16 may include two sets of power control parameters.

In such embodiments, the BS may need to indicate the TRP(s) where the PUSCH transmission is transmitted. That is, the BS may need to indicate the SRS resource set(s) based on which the PUSCH transmission is transmitted, then the associated set of power control parameters could be determined for the corresponding PUSCH transmission. Depending on different types of CG configurations, the BS may use different methods to indicate the SRS resource set(s) to the UE.

In the case that the PUSCH transmission is a CG Type 2 PUSCH transmission, the BS may transmit to the UE a DCI (i.e., the activating DCI) to activate the PUSCH transmission. The DCI (e.g., DCI format 0_1 or DCI format 0_2) may include a PUSCH mode field for indicating whether the PUSCH transmission is transmitted based on SRS resource(s) in the first SRS resource set, SRS resource(s) in the second SRS resource set, or both SRS resource(s) in the first SRS resource set and SRS resource(s) in the second SRS resource set.

In such embodiment, the DCI activating the PUSCH transmission may also include two SRI fields and two transmission precoding matrix indicator (TPMI) fields (e.g. precoding information and number of layers fields as specified in 3GPP standard documents). An SRI field may be used to indicate the SRS resource(s) in an SRS resource set used for the PUSCH transmission. In addition, for a non-codebook based PUSCH transmission, the first SRI field may also indicate the number of layers of the PUSCH transmission to both TRPs. The TPMI fields are for codebook based PUSCH transmission only, wherein a TPMI field is used for indicating a precoding matrix index from a pre-defined codebook to a UE based on the SRS resource(s) in the configured SRS resource set indicated by an SRI field in the DCI.

In an embodiment of the present application, the PUSCH mode field may be a 2-bit field in the DCI. For example, the following Table 1 provides an example of codepoints of a 2-bit PUSCH mode field.

TABLE 1 codepoints of a 2-bit PUSCH mode field

| PUSCH mode Codepoint | SRS resource set(s) | SRI (for both CB and nCB)/TPMI (CB only) field(s) |
|---|---|---|
| 00 | S-TRP mode with first SRS resource set (TRP #1) | first SRI/TPMI field (second SRI/TPMI field is unused) |
| 01 | S-TRP mode with second SRS resource set (TRP #2) | first SRI/TPMI field (second SRI/TPMI field is unused) |

TABLE 1-continued codepoints of a 2-bit PUSCH mode field

| PUSCH mode Codepoint | SRS resource set(s) | SRI (for both CB and nCB)/TPMI (CB only) field(s) |
|---|---|---|
| 10 | M-TRP mode with (TRP #1, TRP #2 order); first SRI/TPMI field: first SRS resource set; second SRI/TPMI field: second SRS resource set | both first and second SRI/TPMI fields |
| 11 | M-TRP mode with (TRP #2, TRP #1 order); first SRI/TPMI field: not determined; second SRI/TPMI field: not determined | both first and second SRI/TPMI fields |

Referring to Table 1, the PUSCH mode field being “00” means that:

The PUSCH transmission is an S-TRP based PUSCH transmission.

The PUSCH transmission is transmitted based on the SRS resource(s) in the first SRS resource set. That is, the PUSCH transmission is towards the first TRP (i.e., TRP #1).

The first SRI field is used to indicate the SRS resource(s) in the first SRS resource set used for the PUSCH transmission, while the second SRI field is not used and can be ignored by the UE. That is, the first SRI field is associated with the first SRS resource set. Also, the first TPMI field is used if the PUSCH transmission is a codebook based PUSCH transmission and is associated with the first SRS resource set, while the second TPMI field is not used and can be ignored by the UE.

The PUSCH mode field being “01” means that:

The PUSCH transmission is an S-TRP based PUSCH transmission.

The PUSCH transmission is transmitted based on the SRS resource(s) in the second SRS resource set. That is, the PUSCH transmission is towards the second TRP (i.e., TRP #2).

The first SRI field is used to indicate the SRS resource(s) in the second SRS resource set used for the PUSCH transmission, while the second SRI field is not used and can be ignored by the UE. That is, the first SRI field is associated with the second SRS resource set. Also, the first TPMI field is used if the PUSCH transmission is a codebook based PUSCH transmission and is associated with the second SRS resource set, while the second TPMI field is not used and can be ignored by the UE.

The PUSCH mode field being “10” means that:

The PUSCH transmission is an M-TRP based PUSCH transmission.

The PUSCH transmission is transmitted based on both the SRS resource(s) in the first SRS resource set and the SRS resource(s) in the second SRS resource set. That is, the PUSCH transmission is towards both the first TRP (i.e., TRP #1) and the second TRP (i.e., TRP #2).

Both the first SRI field and the second SRI field are used. The first SRI field is used to indicate the SRS resource(s) in the first SRS resource set used for the PUSCH transmission to TRP #1, and the second SRI field is used to indicate the SRS resource(s) in the second SRS resource set used for the PUSCH transmission to TRP #2. That is, the first SRI field is associated with the first SRS resource set and the second SRI field is associated with the second SRS resource set. Also, both the first TPMI field and the second TPMI field are used if the PUSCH transmission is a codebook based PUSCH transmission, the first TPMI field is associated with the first SRS resource set and the second TPMI field is associated with the second SRS resource set.

The PUSCH transmission is first towards TRP #1 and then towards TRP #2. That is, the PUSCH transmission is first based on the SRS resource(s) in the first SRS resource set and then based on the SRS resource(s) in the second SRS resource set. In the case that the PUSCH transmission is a codebook based PUSCH transmission, the SRS resource(s) in the first SRS resource set is indicated by the first SRI field and the SRS resource(s) in the second SRS resource set is indicated by the second SRI field. In the case that the PUSCH transmission is a non-codebook based PUSCH transmission, the SRS resource(s) in the first SRS resource set is indicated by the first SRI field, and the SRS resource(s) in the second SRS resource set is indicated by a combination of the first SRI field and the second SRI field. For example, the first SRI field may be used to indicate the rank (i.e., the number of layers) for the non-codebook based PUSCH transmission, and the second SRI field may be used to indicate the SRS resource(s) in the second SRS resource set corresponding to the rank indicated by the first SRI field.

The PUSCH mode field being “11” means that:

The PUSCH transmission is an M-TRP based PUSCH transmission.

The PUSCH transmission is transmitted based on both the SRS resource(s) in the first SRS resource set and the SRS resource(s) in the second SRS resource set. That is, the PUSCH transmission is towards both the first TRP (i.e., TRP #1) and the second TRP (i.e., TRP #2).

Both the first SRI field and the second SRI field are used. However, the correspondence between the two SRS resource sets (i.e., the first SRS resource set and the second resource set) and the two SRI fields (i.e., the first SRI field and the second SRI field) has not been determined yet.

Accordingly, there are two possible correspondences. One is that the first SRI field is used to indicate the SRS resource(s) in the first SRS resource set used for the PUSCH transmission, and the second SRI field is used to indicate the SRS resource(s) in the second SRS resource set used for the PUSCH transmission (i.e., the first SRI field is associated with the first SRS resource set and the second SRI field is associated with the second SRS resource set). The other one is that the first SRI field is used to indicate the SRS resource(s) in the second SRS resource set used for the PUSCH transmission, and the second SRI field is used to indicate the SRS resource(s) in the first SRS resource set used for the PUSCH transmission (i.e., the first SRI field is associated with the second SRS resource set and the second SRI field is associated with the first SRS resource set). Also, both the first TPMI field and the second TPMI field are used if the PUSCH transmission is a codebook based PUSCH transmission, but the correspondence between the two SRS resource sets (i.e., the first SRS resource set and the second resource set) and the two TPMI fields (i.e., the first TPMI field and the second TPMI field) has not been determined yet.

The PUSCH transmission is first towards TRP #2 and then towards TRP #1. That is, the PUSCH transmission is first based on the SRS resource(s) in the second SRS resource set and then based on the SRS resource(s) in the first SRS resource set.

After receiving the CG configuration and the DCI activating the PUSCH transmission, the UE may transmit the PUSCH transmission to the BS based on the CG configuration and the DCI. For example, in the case that the PUSCH mode field in the DCI is "10," the UE may first transmit the PUSCH transmission based on the SRS resource(s) in the first SRS resource set (i.e., to TRP #1) which is (are) indicated by the first SRI field in the DCI. The transmission power may be determined based on the set of power control parameters (including P0, Alpha, and closed loop index) associated with the first SRS resource set configured in the CG configuration and the PL-RS index is determined from an SRI-PUSCH-PowerControl associated with the first SRS resource set with an SRI-PUSCH-PowerControl ID (e.g., PUSCH-PowerControlId as specified in TS 38.331) mapped to the value of the first SRI field in the DCI. Then, the UE may transmit the PUSCH transmission based on the SRS resource(s) in the second SRS resource set (i.e., to TRP #2) which is (are) indicated by the second SRI field in the DCI (or a combination of the first SRI field and the second SRI field in the DCI in the case that the PUSCH transmission is a non-codebook based PUSCH transmission). The transmission power may be determined based on the other set of power control parameters (including P0, Alpha, and closed loop index) associated with the second SRS resource set configured in the CG configuration and the PL-RS index is determined from an SRI-PUSCH-PowerControl associated with the second SRS resource set with an SRI-PUSCH-PowerControl ID (e.g., PUSCH-PowerControlId as specified in TS 38.331) mapped to the value of the second SRI field in the DCI.

Such kind of sequence will be repeated until a maximum number of PUSCH transmissions are reached. The maximum number of PUSCH transmissions may be determined based on the CG configuration. Each PUSCH transmission of the maximum number of PUSCH transmissions may transmit the same transport block (TB).

In the case that the PUSCH transmission is a CG Type 1 PUSCH transmission, the CG configuration transmitted from the BS to the UE may include a PUSCH mode field indicating whether the PUSCH transmission is transmitted based on SRS resource(s) in the first SRS resource set, SRS resource(s) in the second SRS resource set, or both SRS resource(s) in the first SRS resource set and SRS resource(s) in the second SRS resource set.

In such embodiment, the CG configuration may also include two SRI fields and two transmission precoding matrix indicator (TPMI) fields (e.g. precoding information and number of layers fields as specified in 3GPP standard documents). An SRI field may be used to indicate the SRS resource(s) in an SRS resource set used for the PUSCH transmission. In addition, for a non-codebook based PUSCH transmission, the first SRI field may also indicate the number of layers of the PUSCH transmission to both TRPs. The TPMI fields are for codebook based PUSCH transmission only, wherein a TPMI field is used for indicating a precoding matrix index from a pre-defined codebook to a UE based on the SRS resource(s) in the configured SRS resource set indicated by an SRI field in the CG configuration.

FIG. 3 illustrates an exemplary CG configuration according to some embodiments of the present application.

Referring to FIG. 3, the CG configuration includes but is not limited to:

- two TPMI fields, e.g., precodingAndNumberOfLayers may be the first TPMI field and Additional_precodingAndNumberOfLayers may be the second TPMI field;
- two SRI fields, e.g., srs-ResourceIndicator may be the first SRI field and Additional_srs-ResourceIndicator may be the second SRI field;
- two sets of power control parameters, e.g., one set of power control parameters including p0-PUSCH-Alpha, powerControlLoopToUse, and pathlossReferenceIndex may be associated with the first SRS resource set, and the other set of power control parameters including Additional_p0-PUSCH-Alpha, Additional_powerControlLoopToUse, and Additional_pathlossReferenceIndex may be associated with the second SRS resource set.

In addition, the CG configuration may further include a newly added parameter "PUSCH_mode." The value of "PUSCH_mode" may be 0 (i.e., "00"), 1 (i.e., "01"), 2 (i.e., "10"), or 3 (i.e., "11"), wherein each state of "PUSCH_mode" may have the same meaning as the codepoints of PUSCH mode field in Table 1.

After receiving the CG configuration, the UE may transmit the PUSCH transmission to the BS based on the CG configuration. For example, in the case that the PUSCH mode field (e.g., PUSCH_mode in FIG. 3) in the CG configuration is "10," the UE may first transmit the PUSCH transmission based on the SRS resource(s) in the first SRS resource set (i.e., to TRP #1) which is (are) indicated by the first SRI field in the CG configuration. The transmission power may be determined based on the set of power control parameters (including P0, Alpha, closed loop index, and PL-RS index) associated with the first SRS resource set in the CG configuration. Then, the UE may transmit the PUSCH transmission based on the SRS resource(s) in the second SRS resource set (i.e., to TRP #2) which is (are) indicated by the second SRI field in the CG configuration (or a combination of the first SRI field and the second SRI field in the CG configuration in the case that the PUSCH transmission is a non-codebook based PUSCH transmission). The transmission power may be determined based on the other set of power control parameters (including P0, Alpha, closed loop index, and PL-RS index) associated with the second SRS resource set in the CG configuration.

Such kind of sequence will be repeated until a maximum number of PUSCH transmissions are reached. The maximum number of PUSCH transmissions may be determined based on the CG configuration. Each PUSCH transmission of the maximum number of PUSCH transmissions may transmit the same TB.

According to some other embodiments of the present application, the CG configuration may include only one set of power control parameters. The CG configuration may also include one SRI field and one TPMI field as that in Rel-16. The set of power control parameters may be associated with the first SRS resource set or the second SRS resource set. For example, 12 CG configurations may be configured in a BWP in Rel-16, wherein one or more CG configurations may include only one set of power control parameters while the other CG configuration(s) may include two sets of power control parameters (or each of the 12 CG configurations may include only one set of power control parameters). PUSCH transmission in an M-TRP mode may base on a CG configuration with two sets of power control parameters, whereas PUSCH transmission in an S-TRP mode may base on either a CG configuration with only one set of power control parameters or a CG configuration with two sets of power control parameters with an indication of the PUSCH transmission based on which set of power control parameters.

For the PUSCH transmission based on a CG configuration with only one set of power control parameters (i.e., the PUSCH transmission in an S-TRP mode), in the case that the PUSCH transmission is a CG Type 2 PUSCH transmission, the BS may transmit to the UE a DCI (i.e., the activating DCI) to activate the PUSCH transmission. The DCI (e.g., DCI format 0_1 or DCI format 0_2) may include a PUSCH mode field indicating whether the PUSCH transmission is transmitted based on SRS resource(s) in the first SRS resource set or SRS resource(s) in the second SRS resource set. In an embodiment of the present application, the PUSCH mode field in the DCI may be a 2-bit field as defined in Table 1, and the PUSCH mode field being "10" and the PUSCH mode field being "11" in Table 1 may not be used because the PUSCH transmission in an S-TRP mode.

After receiving the CG configuration and the DCI, the UE may transmit the PUSCH transmission to the BS based on the CG configuration and the DCI. For example, in the case that the PUSCH mode field in the DCI is "01", the UE may transmit the PUSCH transmission based on the SRS resource(s) in the second SRS resource set (i.e., to TRP #2) which is (are) indicated by the first SRI field in the DCI. The transmission power may be determined based on the set of power control parameters (including P0, Alpha, and closed loop index) in the CG configuration (which is associated with the second SRS resource set) and the PL-RS index is determined from an SRI-PUSCH-PowerControl associated with the second SRS resource set with an SRI-PUSCH-PowerControl ID (e.g., PUSCH-PowerControlId as specified in TS 38.331) mapped to the value of the first SRI field in the DCI. Such kind of transmission will be repeated until a maximum number of PUSCH transmissions are reached. The maximum number of PUSCH transmissions may be determined based on the CG configuration. Each PUSCH transmission of the maximum number of PUSCH transmissions may transmit the same TB.

In the case that the PUSCH transmission is a CG Type 1 PUSCH transmission, the CG configuration (including only one set of power control parameters) transmitted from the BS to the UE may include a 2-bit PUSCH mode field as that in Table 1 indicating whether the PUSCH transmission is transmitted based on SRS resource(s) in the first SRS resource set or SRS resource(s) in the second SRS resource set, and the PUSCH mode field being "10" and the PUSCH mode field being "11" in Table 1 may not be used because the PUSCH transmission is in an S-TRP mode.

In an embodiment, the PUSCH mode field in the CG configuration may be a 1-bit field, wherein the PUSCH mode field being "0" may indicate that the PUSCH transmission is transmitted based on SRS resource(s) indicated by the SRI field in the CG configuration in the first SRS resource set, and the PUSCH mode field being "1" may indicate that the PUSCH transmission is transmitted based on SRS resource(s) indicated by the SRI field in the CG configuration in the second SRS resource set.

In another embodiment, the CG configuration may include an ID of the first SRS resource set or the second SRS resource set used for the PUSCH transmission.

After receiving the CG configuration, the UE may transmit the PUSCH transmission to the BS based on the CG configuration. For example, in the case that the PUSCH mode field in the CG configuration is "01" or "1" or the CG configuration includes the ID of the second SRS resource set, the UE may transmit the PUSCH transmission based on the SRS resource(s) in the second SRS resource set to TRP #2. The transmission power may be determined based on the set of power control parameters (including P0, Alpha, closed loop index, and PL-RS index) in the CG configuration, which is associated with the second SRS resource set. Such kind of transmission will be repeated until a maximum number of PUSCH transmissions are reached. The maximum number of PUSCH transmissions may be determined based on the CG configuration. Each PUSCH transmission of the maximum number of PUSCH transmissions may transmit the same TB.

When the CG Type 1 or Type 2 PUSCH transmission is incorrectly decoded, in step 205, the BS may transmit DCI (also referred to as "scheduling DCI") scheduling a PUSCH retransmission corresponding to the PUSCH transmission according to the CG configuration. The DCI (e.g., DCI format 0_1 or DCI format 0_2) scheduling the PUSCH retransmission may be with CRC scrambled by CS-RNTI with NDI=1 and the HPN field in the DCI has the same value as that of the PUSCH transmission.

The DCI scheduling the PUSCH retransmission may include a PUSCH mode field indicating whether the PUSCH retransmission is transmitted based on SRS resource(s) in the first SRS resource set, SRS resource(s) in the second SRS resource set, or both SRS resource(s) in the first SRS resource set and SRS resource(s) in the second SRS resource set. In some embodiments of the present application, the PUSCH mode field in the DCI scheduling the PUSCH retransmission may be a 2-bit field, and the codepoints of the 2-bit PUSCH mode field in the DCI scheduling the PUSCH retransmission may the same as those in Table 1.

Consequently, in step 206, the UE may receive the DCI scheduling a PUSCH retransmission corresponding to the PUSCH transmission according to the CG configuration. Then, in step 207, the UE may transmit the PUSCH retransmission and determine at least one set of power control parameters for the PUSCH retransmission.

In the case that the CG configuration includes two sets of power control parameters, for the PUSCH retransmission based on SRS resource(s) in the first SRS resource set as indicated by the PUSCH mode field in the scheduling DCI, the UE may determine the set of power control parameters associated with the first SRS resource set in the CG configuration to be used for the PUSCH retransmission. For the PUSCH retransmission based on SRS resource(s) in the second SRS resource set as indicated by the PUSCH mode field in the scheduling DCI, the UE may determine the other set of power control parameters associated with the second SRS resource set in the CG configuration to be used for the PUSCH retransmission.

In the case that the PUSCH retransmission is a CG Type 1 PUSCH retransmission (i.e., the PUSCH retransmission corresponding to a CG Type 1 PUSCH transmission), the set of power control parameters associated with the first SRS resource set or the other set of power control parameters associated with the second SRS resource set in the CG configuration may include: P0 (e.g., "P0" in "p0-PUSCH-Alpha" as specified in 3GPP standard documents), Alpha (e.g., "Alpha" in "p0-PUSCH-Alpha" as specified in 3GPP standard documents), closed loop index (e.g., powerControlLoopToUse as specified in 3GPP standard documents), and PL-RS index (e.g., pathlossReferenceIndex as specified in 3GPP standard documents).

In the case that the PUSCH retransmission is a CG Type 2 PUSCH retransmission (i.e., the PUSCH retransmission corresponding to a CG Type 2 PUSCH transmission), the set of power control parameters associated with the first SRS resource set or the other set of power control parameters associated with the second SRS resource set in the CG configuration may include: P0, Alpha, and closed loop index. The PL-RS index associated with the first SRS resource set may be determined based on an SRI field associated with the first SRS resource set indicated by the PUSCH mode field in the activation DCI for activating the PUSCH transmission, and the PL-RS index associated with the second SRS resource set may be determined based on another SRI field associated with the second SRS resource set indicated by the PUSCH mode field in the activation DCI for activating the PUSCH transmission.

FIG. 4 illustrates exemplary PUSCH transmission and PUSCH retransmission towards different TRPs according to some embodiments of the present application.

It is assumed that: two SRS resource sets are configured for a UE for a codebook based PUSCH transmission, wherein the first SRS resource set is configured for the PUSCH transmission to TRP #1 and the second SRS resource set is configured for the PUSCH transmission to TRP #2; a CG configuration #0 transmitted from the BS to the UE is CG Type 1, which includes two SRI fields, two sets of power control parameters wherein a first set of power control parameters is associated with the first SRS resource set and a second set of power control parameters is associated with the second SRS resource set, and a PUSCH mode field as shown in FIG. 3; and the PUSCH mode field in the CG configuration #0 equals “00.”

After receiving the CG configuration #0, the UE may transmit a PUSCH transmission based on the SRS resource(s) in the first SRS resource set (i.e., to TRP #1) which is (are) indicated by the first SRI field in the CG configuration #0, and the transmission power of the PUSCH transmission may be determined based on the first set of power control parameters (including P0, Alpha, closed loop index, and PL-RS index) associated with the first SRS resource set in the CG configuration #0.

The PUSCH transmission shown in FIG. 4 may include n different PUSCH transmissions with hybrid automatic repeat request (HARQ) processes with HARQ process number (HPN)=0, HPN=1, . . . , and HPN=n−1 respectively, wherein n is an integer no less than 1. The different PUSCH transmissions carry different TBs. The periodicity and the repetition number of transmissions for a PUSCH transmission may be determined based on the CG configuration #0. For example, the repetition number of transmissions for a PUSCH transmission is 4 in FIG. 4, and the 4 transmissions for a PUSCH transmission carry a same TB.

It is assumed that the PUSCH transmission with HPN=1 is decoded incorrectly, the BS may transmit DCI (e.g., a DCI format 0_1) to schedule a PUSCH retransmission corresponding to the PUSCH transmission with HPN=1, and the DCI includes a PUSCH mode field being “01.”

After receiving the DCI, the UE may transmit the PUSCH retransmission based on the SRS resource(s) in the second SRS resource set (i.e., to TRP #2) which is (are) indicated by the first SRI field in the DCI, and the transmission power of the PUSCH retransmission may be determined based on the second set of power control parameters (including P0, Alpha, closed loop index, and PL-RS index) associated with the second SRS resource set in the CG configuration #0. The repetition number of transmissions for the PUSCH retransmission may be determined based on pusch-Config as specified in 3GPP standard documents. For example, the repetition number of transmissions for the PUSCH retransmission is 2 in FIG. 4.

In the case that the CG configuration includes only one set of power control parameters, according to some embodiments of the present application, for the PUSCH retransmission based on SRS resource(s) in an SRS resource set indicated by the PUSCH mode field in the scheduling DCI which is the same as the SRS resource set used for the PUSCH transmission, the UE may determine the set of power control parameters used for the PUSCH transmission to be reused for the PUSCH retransmission. For the PUSCH retransmission based on SRS resource(s) in an SRS resource set indicated by the PUSCH mode field in the scheduling DCI which is different from the SRS resource set used for the PUSCH transmission, the UE may determine a set of power control parameters to be used for the PUSCH retransmission based on an SRI field in the DCI which is associated with the SRS resource set indicated by the PUSCH mode field in the DCI scheduling the PUSCH retransmission.

According to some other embodiments of the present application, for the PUSCH retransmission based on SRS resource(s) in an SRS resource set indicated by the PUSCH mode field in the scheduling DCI (regardless of whether the SRS resource set is the same as or different from the SRS resource set used for the PUSCH transmission), the UE may determine a set of power control parameters to be used for the PUSCH retransmission based on an SRI field associated with the SRS resource set in the DCI scheduling the PUSCH retransmission.

Figure 5:
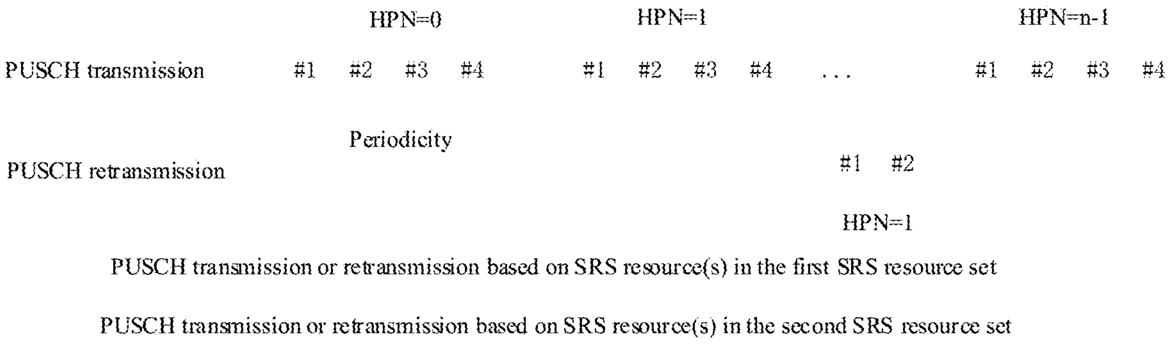
FIG. 5 illustrates exemplary PUSCH transmission and PUSCH retransmission towards different TRPs according to some embodiments of the present application.

FIG. 5 illustrates exemplary PUSCH transmission and PUSCH retransmission towards different TRPs according to some other embodiments of the present application.

It is assumed that: two SRS resource sets are configured for a UE for a non-codebook based PUSCH transmission, wherein the first SRS resource set is configured for the PUSCH transmission to TRP #1 and the second SRS resource set is configured for the PUSCH transmission to TRP #2; a CG configuration #1 transmitted from the BS to the UE is CG Type 2, which includes only one set of power control parameters (including P0, Alpha, and closed loop index); and a DCI format 0_1 #0 activates the CG Type 2 PUSCH transmission with a PUSCH mode field being “00.”

After receiving the CG configuration #1 and DCI format 0_1 #0, the UE may transmit a PUSCH transmission based on the SRS resource(s) in the first SRS resource set (i.e., to TRP #1) which is (are) indicated by the first SRI field in DCI format 0_1 #0, and the transmission power of the PUSCH transmission may be determined based on the set of power control parameters (including P0, Alpha, and closed loop index) in the CG configuration #1, which is associated with the first SRS resource set, and the PL-RS index is determined from SRI-PUSCH-PowerControl associated with the first SRS resource set with an sri-PUSCH-PowerControlId mapped to a value of the first SRI field in DCI format 0_1 #0.

The PUSCH transmission shown in FIG. 5 may include n different PUSCH transmissions with HARQ processes with HARQ process number (HPN)=0, HPN=1, . . . , and HPN=n−1, respectively, wherein n is an integer no less than 1. The different PUSCH transmissions carry different TBs. The periodicity and the repetition number of transmission for a PUSCH transmission may be determined based on the CG configuration #1. For example, the repetition number of transmissions for a PUSCH transmission is 4 in FIG. 5, and the 4 transmissions for a PUSCH transmission carry a same TB.

It is assumed that the PUSCH transmission with HPN=1 is decoded incorrectly, the BS may transmit DCI format 0_1 #1 to schedule a PUSCH retransmission corresponding to the PUSCH transmission with HPN=1, and DCI format 0_1 #1 includes a PUSCH mode field being "10."

Then, after receiving DCI format 0_1 #1, the UE may first transmit the PUSCH retransmission (e.g., PUSCH retransmission #1) based on the SRS resource(s) in the first SRS resource set (i.e., to TRP #1) which is (are) indicated by the first SRI field in DCI format 0_1 #1, and then transmit the PUSCH retransmission (e.g., PUSCH retransmission #2) based on the SRS resource(s) in the second SRS resource set (i.e., to TRP #2) which is (are) indicated by a combination of the first SRI field and the second SRI field in DCI format 0_1 #1. The repetition number of transmissions for the PUSCH retransmission may be determined based on pusch-Config as specified in 3GPP standard documents. For example, the repetition number of transmissions for the PUSCH retransmission is 2 in FIG. 5.

In an embodiment of the present application, for the PUSCH retransmission (e.g., PUSCH retransmission #1) based on SRS resource(s) in the first SRS resource set which is also used for the PUSCH transmission, the UE may determine that the power control parameters configured in CG configuration #1 for the PUSCH transmission to be reused for the PUSCH retransmission. That is, the UE may determine the set of power control parameters (including P0, Alpha, and closed loop index) in the CG configuration #1, which is associated with the first SRS resource set, and the PL-RS index determined from SRI-PUSCH-PowerControl associated with the first SRS resource set with an sri-PUSCH-PowerControlId mapped to a value of the first SRI field in DCI format 0_1 #0 to be reused to determine the transmission power of PUSCH retransmission #1.

For the PUSCH retransmission (e.g., PUSCH retransmission #2) based on SRS resource(s) in the second SRS resource set which is different from the SRS resource set used for the PUSCH transmission, the transmission power of the PUSCH retransmission may be determined based on a set of power control parameters (e.g., P0, alpha, closed loop index and PL-RS index) determined from SRI-PUSCH-PowerControl with an sri-PUSCH-PowerControId mapped to a value of the second SRI field associated with the second SRS resource set in DCI format 0_1 #1.

In another embodiment of the present application, for the PUSCH retransmission (e.g., PUSCH retransmission #1) based on SRS resource(s) in the first SRS resource set, the UE may determine a set of power control parameters (e.g., P0, alpha, closed loop index and PL-RS index) from SRI-PUSCH-PowerControl with an sri-PUSCH-PowerControlId mapped to a value of the first SRI field associated with the first SRS resource set in DCI format 0_1 #1; for the PUSCH retransmission (e.g., PUSCH retransmission #2) based on SRS resource(s) in the second SRS resource set, the transmission power of the PUSCH retransmission may be determined based on a set of power control parameters (e.g., P0, alpha, closed loop index and PL-RS index) determined from SRI-PUSCH-PowerControl with an sri-PUSCH-PowerControlId mapped to a value of the second SRI field associated with the second SRS resource set in DCI format 0_1 #1.

According to some embodiments of the present application, a CG Type 2 PUSCH transmission may be activated by a DCI format 0_0 transmitted from a BS to a UE. The CG configuration for the PUSCH transmission may include two sets of power control parameters (including P0, Alpha, and closed loop index) associated with two SRS resource sets, respectively.

In an embodiment of the present application, the DCI format 0_0 may include a PUSCH mode field indicating whether the PUSCH transmission is transmitted based on SRS resource(s) in the first SRS resource set or SRS resource(s) in the second SRS resource set.

For example, the PUSCH mode field in the DCI format 0_0 may be a 1-bit field, wherein the PUSCH mode field being "0" means that the PUSCH transmission is based on SRS resource(s) in the first SRS resource set, and the PUSCH mode field being "1" means that the PUSCH transmission is based on SRS resource(s) in the second SRS resource set.

Then, after receiving the DCI format 0_0, the UE may determine a set of power control parameters associated with the first SRS resource set or the second SRS resource set indicated by the PUSCH mode field to be used for the PUSCH transmission.

In another embodiment of the present application, the DCI format 0_0 may not include a PUSCH mode field. Then, after receiving the DCI format 00, the UE may determine one SRS resource set of the first SRS resource set and the second SRS resource set and a set of power control parameters associated with the one SRS resource set to be used for the PUSCH transmission based on a pre-defined rule. For example, the pre-defined rule may be that the first SRS resource set and the first set of power control parameters configured in the CG configuration are used for the PUSCH transmission, or be that the second SRS resource set and the second set of power control parameters configured in the CG configuration are used for the PUSCH transmission.

According to some embodiments of the present application, the DCI scheduling the PUSCH retransmission (e.g., a CG Type 1 PUSCH retransmission or a CG Type 2 PUSCH retransmission) is a DCI format 0_0. The CG configuration for the PUSCH transmission corresponding to the PUSCH retransmission may include two sets of power control parameters (including P0, Alpha, and closed loop index) associated with two SRS resource sets, respectively.

In an embodiment of the present application, the DCI format 0_0 may include a PUSCH mode field indicating whether the PUSCH retransmission is transmitted based on SRS resource(s) in the first SRS resource set or SRS resource(s) in the second SRS resource set.

For example, the PUSCH mode field in the DCI format 0_0 may be a 1-bit field, wherein the PUSCH mode field being "0" means that the PUSCH retransmission is based on SRS resource(s) in the first SRS resource set, and the PUSCH mode field being "1" means that the PUSCH retransmission is based on SRS resource(s) in the second SRS resource set.

Then, after receiving the DCI format 0_0, the UE may determine a set of power control parameters associated with the first SRS resource set or the second SRS resource set indicated by the PUSCH mode field to be used for the PUSCH retransmission.

In another embodiment of the present application, the DCI format 0_0 may not include a PUSCH mode field. Then, after receiving the DCI format 00, the UE may determine one SRS resource set of the first SRS resource set and the second SRS resource set and a set of power control parameters associated with the one SRS resource set to be used for the PUSCH retransmission based on a pre-defined rule. For example, the pre-defined rule may be that the first SRS resource set and the first set of power control parameters are used for the PUSCH retransmission, or be that the second SRS resource set and the second set of power control parameters are used for the PUSCH retransmission.

For example, it is assumed that: two SRS resource sets are configured for a UE for a codebook based PUSCH transmission, wherein the first SRS resource set is configured for the PUSCH transmission to TRP #1 and the second SRS resource set is configured for the PUSCH transmission to TRP #2; a CG configuration #2 transmitted from the BS to the UE is CG Type 2, which includes two sets of power control parameters (each set of power control parameter includes P0, Alpha, and closed loop index) wherein a first set of power control parameters is associated with the first SRS resource set and a second set of power control parameters is associated with the second SRS resource set; a DCI #0 (which is a DCI format 0_0) activates the CG Type 2 PUSCH transmission with HPN being "1" according to CG configuration #2 without including a PUSCH mode field.

After receiving the CG configuration #2 and DCI #0, the UE may transmit a PUSCH transmission based on a pre-defined rule. For example, the pre-defined rule may be that the first SRS resource set and the first set of power control parameters associated with the first SRS resource set are used for the PUSCH transmission. Then, the UE may transmit the PUSCH transmission based on the first SRS resource set to TRP #1, and the first set of power control parameters associated with the first SRS resource set configured in the CG configuration #2 will be used for calculating the transmission power of the PUSCH transmission. The PL-RS is determined with an ID (e.g., PUSCH-PathlossReferenceRS-Id as specified in TS 38.331) being "0", which is determined based on the same rule as defined in Rel-16.

It is assumed that the PUSCH transmission is decoded incorrectly, and the BS may transmit a DCI #1 (which is another DCI format 0_0 without a PUSCH mode field) to schedule a PUSCH retransmission corresponding to the PUSCH transmission, wherein DCI #1 is with CRC scrambled by CS-RNTI and an NDI field and an HPN field in the DCI #1 are 1.

After receiving DCI #1, the UE may transmit the PUSCH retransmission based on a predefined rule. For example, the pre-defined rule may be that the first SRS resource set and the first set of power control parameters associated with the first SRS resource set are used for the PUSCH retransmission. Then, the UE may transmit the PUSCH retransmission based on the first SRS resource set to TRP #1, and the first set of power control parameters associated with the first SRS resource set configured in the CG configuration #2 will be used for calculating the transmission power of the PUSCH retransmission.

Figure 6:
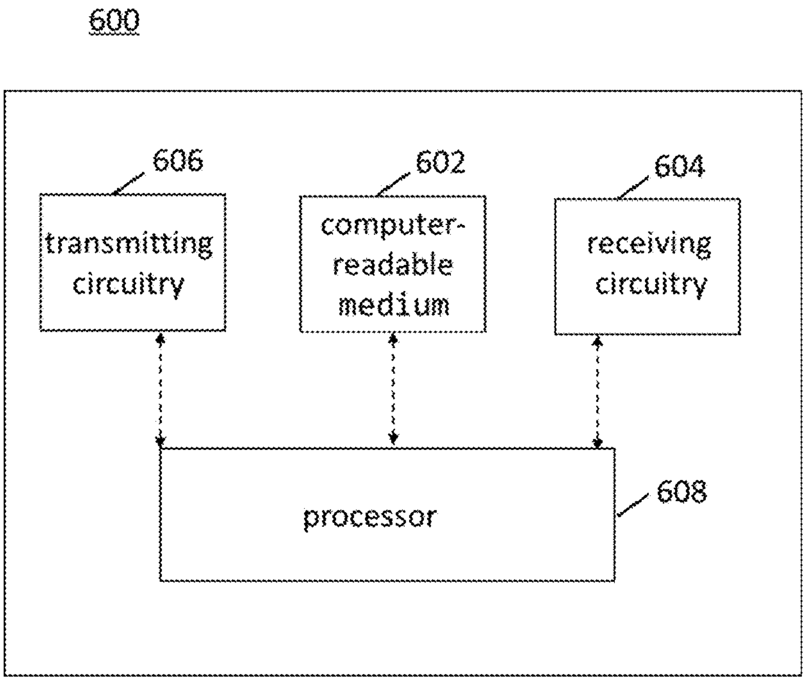
FIG. 6 illustrates a simplified block diagram of an exemplary apparatus for M-TRP based transmission according to some embodiments of the present application.

FIG. 6 illustrates a simplified block diagram of an exemplary apparatus 600 for M-TRP based transmission according to some embodiments of the present application. The apparatus 600 may be or include at least a part of a BS 101 or a UE 105 (for example, UE 105*a*, UE 105*b*, or UE 105*c*) as shown in FIG. 1 or other device with similar functionality.

Referring to FIG. 6, the apparatus 600 may include at least one non-transitory computer-readable medium 602, at least one receiving circuitry 604, at least one transmitting circuitry 606, and at least one processor 608. In some embodiments of the present application, the at least one receiving circuitry 604 and the at least one transmitting circuitry 606 can be integrated into at least one transceiver. The at least one non-transitory computer-readable medium 602 may have computer executable instructions stored therein. The at least one processor 608 may be coupled to the at least one non-transitory computer-readable medium 602, the at least one receiving circuitry 604 and the at least one transmitting circuitry 606. In some embodiments, the at least one processor 608, the at least one non-transitory computer-readable medium 602, the at least one receiving circuitry 604 and the at least one transmitting circuitry 606 may be coupled via a bus. The computer executable instructions can be programmed to implement any method as described in the present application (e.g., the method shown in FIG. 2) with the at least one receiving circuitry 604, the at least one transmitting circuitry 606 and the at least one processor 608.

For example, the apparatus 600 can be a UE. The computer executable instructions, when executed by the at least one processor 608, can cause the apparatus 600 to receive, with the at least one receiving circuitry 604, configuration information of a first SRS resource set and a second SRS resource set for a codebook or non-codebook based PUSCH transmission. The computer executable instructions, when executed by the at least one processor 608, can further cause the apparatus 600 to receive, with the at least one receiving circuitry 604, a CG configuration for the PUSCH transmission, wherein the CG configuration includes one or two sets of power control parameters, and each set of power control parameter is associated with one SRS resource set of the first SRS resource set or the second SRS resource set. The computer executable instructions, when executed by the at least one processor 608, can further cause the apparatus 600 to receive, with the at least one receiving circuitry 604, DCI scheduling a PUSCH retransmission corresponding to the PUSCH transmission according to the CG configuration. The computer executable instructions, when executed by the at least one processor 608, can further cause the apparatus 600 to determine, with the at least one processor 608, at least one set of power control parameters for the PUSCH retransmission.

As another example, the apparatus 600 can be a BS. The computer executable instructions, when executed by the at least one processor 608, can cause the apparatus 600 to transmit, with the at least one transmitting circuitry 606, configuration information of a first SRS resource set and a second SRS resource set for a codebook or non-codebook based PUSCH transmission. The computer executable instructions, when executed by the at least one processor 608, can cause the apparatus 600 to transmit, with the at least one transmitting circuitry 606, a CG configuration for the PUSCH transmission, wherein the CG configuration includes one or two sets of power control parameters, and each set of power control parameter is associated with one SRS resource set of the first SRS resource set or the second SRS resource set. The computer executable instructions, when executed by the at least one processor 608, can cause the apparatus 600 to transmit, with the at least one transmitting circuitry 606, DCI scheduling a PUSCH retransmission corresponding to the PUSCH transmission according to the CG configuration.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for M-TRP based transmission, including a processor and a memory. Computer programmable instructions for implementing a method for M-TRP based transmission are stored in the memory, and the processor is configured to perform the computer programmable instructions to implement the method for M-TRP based transmission. The method for M-TRP based transmission may be any method as described in the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for M-TRP based transmission according to any embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communications, comprising:

at least one memory; and at least one processor coupled with the at least one memory and configured to cause the UE to:

receive configuration information of a first sounding reference signal (SRS) resource set and a second SRS resource set for a codebook or non-codebook based physical uplink shared channel (PUSCH) transmission;

receive a configured grant (CG) configuration for the PUSCH transmission, wherein the CG configuration comprises one or two sets of power control parameters, and each set of power control parameter is associated with one SRS resource set of the first SRS resource set or the second SRS resource set;

receive downlink control information (DCI) scheduling a PUSCH retransmission corresponding to the PUSCH transmission according to the CG configuration; and determine at least one set of power control parameters for the PUSCH retransmission.

2. The UE of claim 1, wherein the DCI comprises a PUSCH mode field indicating whether the PUSCH retransmission is transmitted based on SRS resource(s) in the first SRS resource set, SRS resource(s) in the second SRS resource set, or both SRS resource(s) in the first SRS resource set and SRS resource(s) in the second SRS resource set.

3. The UE of claim 2, wherein the CG configuration comprises two sets of power control parameters, wherein one set of power control parameters is associated with the first SRS resource set, and the other set of power control parameters is associated with the second SRS resource set.

4. The UE of claim 3, wherein, when the PUSCH transmission is a CG Type 1 PUSCH transmission, the CG configuration comprises a PUSCH mode field indicating whether the PUSCH transmission is transmitted based on SRS resource(s) in the first SRS resource set, SRS resource(s) in the second SRS resource set, or both SRS resource(s) in the first SRS resource set and SRS resource(s) in the second SRS resource set.

5. The UE of claim 3, wherein the processor is configured to cause the UE to determine the at least one set of power control parameters for the PUSCH retransmission comprises by:

for the PUSCH retransmission based on SRS resource(s) in the first SRS resource set as indicated by the PUSCH mode field in the DCI, determining, based on the CG configuration, the one set of power control parameters corresponding to the first SRS set to be used for the PUSCH retransmission; and for the PUSCH retransmission based on SRS resource(s) in the second SRS resource set as indicated by the PUSCH mode field in the DCI, determining, based on the CG configuration, the other set of power control parameters corresponding to the second SRS resource set to be used for the PUSCH retransmission.

6. The UE of claim 2, wherein the CG configuration comprises only one set of power control parameters used for the PUSCH transmission.

7. The UE of claim 6, wherein, when the PUSCH transmission is a CG Type 1 PUSCH transmission, the CG configuration comprises a PUSCH mode field indicating whether the PUSCH transmission is transmitted based on SRS resource(s) in the first SRS resource set or SRS resource(s) in the second SRS resource set.

8. The UE of claim 6, wherein, when the PUSCH transmission is a CG Type 1 PUSCH transmission, the CG configuration comprises an identity (ID) of the first SRS resource set or the second SRS resource set used for the PUSCH transmission.

9. The UE of claim 6, wherein the processor is configured to cause the UE to determine the at least one set of power control parameters for the PUSCH retransmission by:

for the PUSCH retransmission based on SRS resource(s) in an SRS resource set indicated by the PUSCH mode field in the DCI which is the same as an SRS resource set used for the PUSCH transmission, determining the set of power control parameters used for the PUSCH transmission to be reused for the PUSCH retransmission; and for the PUSCH retransmission based on SRS resource(s) in an SRS resource set indicated by the PUSCH mode field in the DCI which is different from an SRS resource set used for the PUSCH transmission, determining a set of power control parameters to be used for the PUSCH retransmission based on an SRS resource indicator (SRI) field in the DCI which is associated with the SRS resource set indicated by the PUSCH mode field in the DCI.

10. The UE of claim 6, wherein the processor is configured to cause the UE to determine the at least one set of power control parameters for the PUSCH retransmission comprises:

for the PUSCH retransmission based on SRS resource(s) in an SRS resource set indicated by the PUSCH mode field in the DCI, determining a set of power control parameters to be used for the PUSCH retransmission based on an SRI field associated with the SRS resource set indicated by the PUSCH mode field in the DCI.

11. The UE of claim 1, wherein the PUSCH transmission is a CG Type 2 PUSCH transmission, the processor is configured to cause the UE to:

receive a DCI format 0_0 to activate the PUSCH transmission; and determine one SRS resource set of the first SRS resource set and the second SRS resource set and a set of power control parameters associated with the one SRS resource set to be used for the PUSCH transmission based on a pre-defined rule.

12. The UE of claim 1, wherein, when the DCI scheduling the PUSCH retransmission is a DCI format 0_0, the DCI format 0_0 comprises a PUSCH mode field indicating whether the PUSCH retransmission is transmitted based on SRS resource(s) in the first SRS resource set or SRS resource(s) in the second SRS resource set, the processor is configured to cause the UE to determine the at least one set of power control parameters for the PUSCH retransmission by:

determining a set of power control parameters associated with the first SRS resource set or the second SRS resource set indicated by the PUSCH mode field in the DCI to be used for the PUSCH retransmission.

13. The UE of claim 1, wherein, when the DCI scheduling the PUSCH retransmission is a DCI format 0_0, the processor is configured to cause the UE to determine the at least one set of power control parameters for the PUSCH retransmission by:

determining the first SRS resource set of the first SRS resource set and the second SRS resource set and a set of power control parameters associated with the first SRS resource set to be used for the PUSCH retransmission.

14. A base station (BS) for wireless communication, comprising:

at least one memory; and at least one processor coupled with the at least one memory and configured to cause the BS to:

transmit configuration information of a first sounding reference signal (SRS) resource set and a second SRS resource set for a codebook or non-codebook based physical uplink shared channel (PUSCH) transmission;

transmit a configured grant (CG) configuration for the PUSCH transmission, wherein the CG configuration comprises one or two sets of power control parameters, and each set of power control parameter is associated with one SRS resource set of the first SRS resource set or the second SRS resource set; and transmit downlink control information (DCI) scheduling a PUSCH retransmission corresponding to the PUSCH transmission according to the CG configuration.

15. A processor for wireless communication, comprising:

at least one controller coupled with at least one memory and configured to cause the processor to:

receive configuration information of a first sounding reference signal (SRS) resource set and a second SRS resource set for a codebook or non-codebook based physical uplink shared channel (PUSCH) transmission;

receive a configured grant (CG) configuration for the PUSCH transmission, wherein the CG configuration comprises one or two sets of power control parameters, and each set of power control parameter is associated with one SRS resource set of the first SRS resource set or the second SRS resource set;

receive downlink control information (DCI) scheduling a PUSCH retransmission corresponding to the PUSCH transmission according to the CG configuration; and determine at least one set of power control parameters for the PUSCH retransmission.

16. The processor of claim 15, wherein the DCI comprises a PUSCH mode field indicating whether the PUSCH retransmission is transmitted based on SRS resource(s) in the first SRS resource set, SRS resource(s) in the second SRS resource set, or both SRS resource(s) in the first SRS resource set and SRS resource(s) in the second SRS resource set.

17. The processor of claim 16, wherein the CG configuration comprises two sets of power control parameters, wherein one set of power control parameters is associated with the first SRS resource set, and the other set of power control parameters is associated with the second SRS resource set.

18. The processor of claim 17, wherein the controller is configured to cause the processor to determine the at least one set of power control parameters for the PUSCH retransmission comprises by:

for the PUSCH retransmission based on SRS resource(s) in the first SRS resource set as indicated by the PUSCH mode field in the DCI, determining, based on the CG configuration, the one set of power control parameters corresponding to the first SRS set to be used for the PUSCH retransmission; and for the PUSCH retransmission based on SRS resource(s) in the second SRS resource set as indicated by the PUSCH mode field in the DCI, determining, based on the CG configuration, the other set of power control parameters corresponding to the second SRS resource set to be used for the PUSCH retransmission.

19. The processor of claim 15, wherein the PUSCH transmission is a CG Type 2 PUSCH transmission, the processor is configured to:

receive a DCI format 0_0 to activate the PUSCH transmission; and determine one SRS resource set of the first SRS resource set and the second SRS resource set and a set of power control parameters associated with the one SRS resource set to be used for the PUSCH transmission based on a pre-defined rule.

20. The processor of claim 15, wherein, when the DCI scheduling the PUSCH retransmission is a DCI format 0_0, the processor is configured to determine the at least one set of power control parameters for the PUSCH retransmission by:

determining the first SRS resource set of the first SRS resource set and the second SRS resource set and a set of power control parameters associated with the first SRS resource set to be used for the PUSCH retransmission.

* * * * *